United States Patent [19]

Ohta et al.

[11] Patent Number: 4,707,755
[45] Date of Patent: Nov. 17, 1987

[54] OPTICAL READ-OUT MAGNETIC HEAD

[75] Inventors: Norio Ohta, Sayama; Shigenori Okamine, Kokubunji; Yutaka Sugita, Tokorozawa; Yosuke Seo, Sagamihara; Takashi Tamura, Kokubunji, all of Japan

[73] Assignee: Hitachi, Ltd., Tokyo, Japan

[21] Appl. No.: 832,884

[22] Filed: Feb. 26, 1986

[30] Foreign Application Priority Data

Mar. 20, 1985 [JP] Japan ................................ 60-54441
Mar. 20, 1985 [JP] Japan ................................ 60-54440

[51] Int. Cl.$^4$ ............................................. G11B 11/10
[52] U.S. Cl. .................................................. 360/114
[58] Field of Search ......................... 360/114; 369/110

[56] References Cited

U.S. PATENT DOCUMENTS 4,228,473 10/1980 Himuro et al. ...................... 360/114

FOREIGN PATENT DOCUMENTS 8403951 7/1985 Netherlands ........................ 360/114

OTHER PUBLICATIONS

IBM/TDB vol. 15, No. 8, Jan. 1973, "Integrated Optic Read-Write Head" by Lean et al.

Primary Examiner—John H. Wolff
Attorney, Agent, or Firm—Antonelli, Terry & Wands

[57] ABSTRACT

An optical read-out magnetic head of a single pole type having a main pole, an auxiliary pole, and a writing coil. The main pole consists of a high permeability film and a magneto-optical film, the magneto-optical film has an easy magnetization axis parallel to or in the extension direction of that film surface high permeability film. Writing is carried out magnetically by employing the coil, and reproduction is effected optically by employing the magneto-optic film.

7 Claims, 7 Drawing Figures

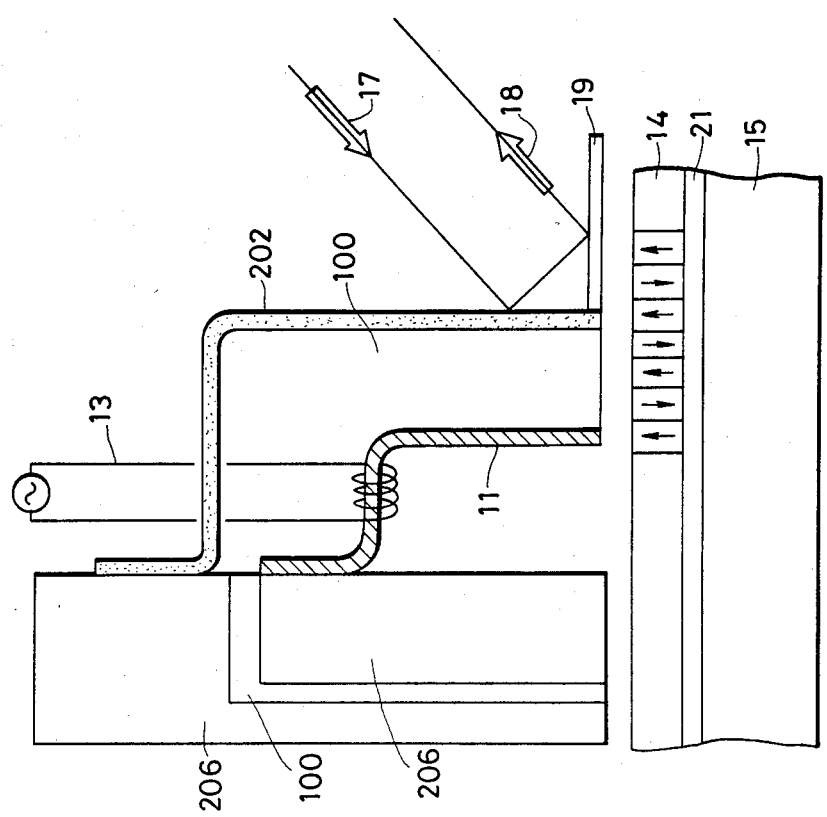
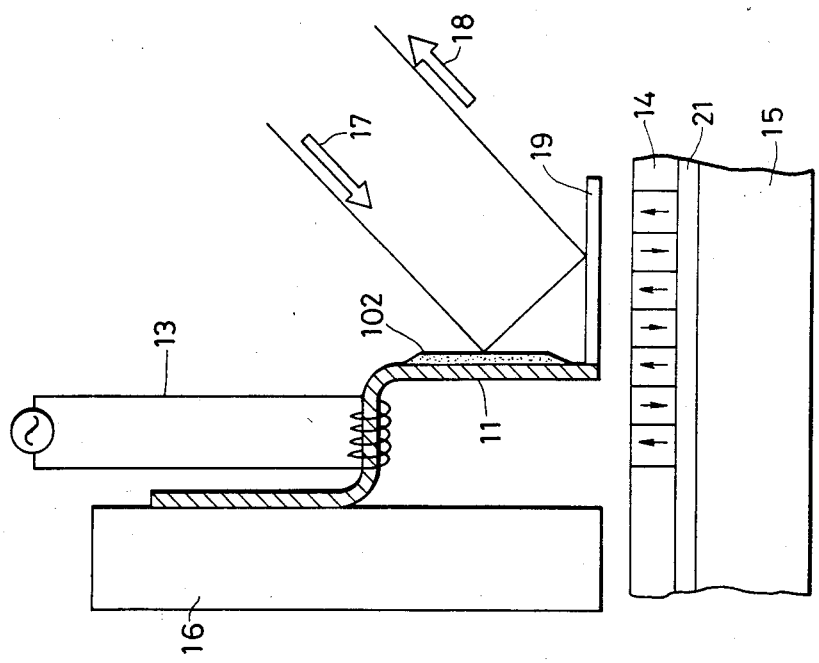

OPTICAL READ-OUT MAGNETIC HEAD

BACKGROUND OF THE INVENTION

The present invention relates to a magnetic recording and reproducing head which can magnetically write and optically read out, and more particularly to a single pole magnetic head of write and read out composite type which is suitable to effect writing and reproducing by means of a single head.

As recording/reproducing systems with high recording density, there are known a perpendicular magnetic recording and reproducing system and a magneto-optical writing and reproducing system. Further, there is also known a recording/reproducing system using a perpendicular magnetic head in recording and an optically read-out head utilizing magneto-optic effect in reproducing, with coupled use of the advantages of both systems.

Heretofore, as a method for optically reproducing magnetized information from a recording medium by means of a magneto-optic effect (Faraday effect, Kerr effect and the like) by magnetically transferring it on a high permeability magnetic film perpendicularly disposed in close adjacency of a medium surface, there can be found a disclosure in the Japanese Patent Application Laid-Open, No. 1244/72 which is based upon U.S. Pat. No. 3,665,431. In case when such a device is used as a head for exclusive use in reproducing, a thin film material with large magneto-optical effect is sufficient to be used as a high permeability thin film, and can display a sufficient characteristic as a single layer. However, in order to write and reproduce at high speed in a magnetic disc apparatus, a magnetic tape device and the like, a structure should be devised which is capable to write and read out with the same head. In this respect, the above-mentioned example lacked the consideration on the function as a head for writing use.

On the other hand, in a prior art optically reproducing type single pole magnetic head shown in FIG. 1, capable of writing and reproducing with the same head, a high permeability magnetic thin film 1 of the main pole was divided into two, and further there was arranged a second magnetic thin film 2, which had an easy magnetization axis in a direction perpendicular to the film surface and was closely adhered thereto, as described in the Japanese Patent Application Laid-Open, No. 169946/82. Thus, a polarized laser beam 9 was irradiated perpendicularly to this second thin magnetic film and the magnetized state of the main pole was discriminated by a the polar Kerr effect, the Faraday effect by perpendicularly incident optical beam, and the like. That is, the reproduction of high density recording was effected by converting the magnetization induced in the main pole from the magnetic medium into the difference of the strength of light. However, in this method, as shown in FIG. 1, since the second magnetic thin film 2 is a perpendicular magnetizable film, almost all of the magnetic flux 4 in the magnetic circuit goes out from the magnetic circuit in the surface of the second magnetic thin film. Therefore, in such a construction, the magnetic circuit of the main pole becomes to have a large open end, and even when the magnetized state of the main pole is required to be reversed in dependence with a magnetic signal, it is necessary to expend extremely large energy. That is, it becomes difficult to let the magnetized state of the main magnetic pole faithfully follow the magnetic signal from the medium. As described above, in the above-described latter example, there lacked the consideration on the magnetic circuit construction for making an optical reproducing head with a high sensitivity.

In FIG. 1, the symbol 3 designates the direction of magnetization, 5 the recording medium, 6 a substrate of the recording medium, 7 an auxillary magnetic pole and 8 a coil for writing.

SUMMARY OF THE INVENTION

An object of the present invention is to provide a new type writing/reproducing composite type magnetic head which magnetically writes and optically reproduces by using the magneto-optical effect in a single pole type magnetic head, and more particularly to provide a writing/reproducing composite type magnetic head with a good signal versus noise ratio by forming a magnetic circuit construction wherein the magnetized induction is faithfully provoked for the magnetic signal from the medium in an optical read-out single pole magnetic head.

In order to attain the above-described object, the optical read-out magnetic head of the present invention has such construction that in a single pole type magnetic head having a main pole, an auxiliary pole and a writing coil, the above-mentioned main pole has a first magnetic thin film having high permeability and high saturation magnetization and a second magnetic thin film having a large magneto-optic effect, such as the Faraday effect, the longitudinal Kerr effect and the like, and the above-mentioned second magnetic thin film is arranged to be capable of being magnetized by the leakage magnetic field from the recording medium, the said second magnetic thin film having an easy magnetization axis parallel to or in the film surface and the writing coil circumventing at least the first magnetic thin film of the main pole or the auxiliary pole.

In the optical read-out magnetic head of the present invention, the writing for the recording medium is magnetically effected by means of said coil in the same manner as in the prior art perpendicular magnetic recording system, and the reading out of recorded signals from the recording medium is effected by the irradiation of the polarized laser beam on the surface of said second magnetic thin film and by measuring the change of polarized angle of the laser beam reflected therefrom to optically reproduce the recorded information. This optical reproducing method is fundamentally the same as the optical reproducing system using the magneto-optic effect in the prior art magneto-optical recording and reproducing system with the exception that the laser irradiated body is the second magnetic thin film mentioned above.

As a recording medium for recording information by use of the magnetic head of the present invention, the prior art perpendicular magnetic recording medium may be used.

For the above-described first magnetic thin film, a magnetic material having high permeability and high saturation magnetization, such as, for example, the known Fe-Ni alloy, Fe-N alloy, Co-Zr alloy or the like as in the main pole of a prior art perpendicular magnetic recording head may be used. In case when the crystallomagnetic anisotropy is present in the first magnetic thin film, it is desirable that the easy magnetization axis is present parallel to or in the film surface, but is not necessarily be limited to such a manner since the anisotropy is comparatively low in general. For said second magnetic thin film a magnetic material having large longitudinal Kerr effect and/or Faraday effect as well as an easy magnetization axis parallel to or in the film surface, such as, for example, magnetic garnet such as the known $Y_3Fe_5O_{12}$ (a so-called YIG) and the like, a magnetic amorphous alloy consisting of a rare earth element and a transient metal element such as Gd-Co, or a magnetic amorphous alloy such as Fe-Co-B-P, Fe-B, Co-Zr or the like may be used.

In order to arrange said second magnetic thin film to be capable of being magnetized by the leakage magnetic field from a recording medium, it is acceptable, for example, to magnetically couple the second magnetic thin film to said first magnetic thin film, or to arrange the second magnetic thin film at approximately right angles to and in close vicinity to the recording medium surface. In order to couple both members magnetically, it is recommended, for example, that the second magnetic thin film is laminated on the first magnetic film to form a main pole with a multi-layered structure, or that the first magnetic thin film is divided, with the divided first magnetic thin films being connected with the second magnetic thin film closely adhered thereto.

Further, a reflection film may be provided in correspodence to needs to make the light path of the laser suitable.

It is needless to say that a substrate for adhering the magnetic materials or the like thereon may be provided and a spacer formed of non-magnetic material may also be provided between layers of the multi-layered films.

BRIEF DESCRIPTION OF THE DRAWINGS

FIGS. 2 to 7 are schematic diagrams for explaining respective embodiments of the present invention.

DESCRIPTION OF THE PREFERRED EMBODIMENTS

At first, in Examples 1-3, there are shown embodiments wherein the main pole of the single pole type magnetic head is formed in a multi-layered thin film structure. This multi-layered thin film structure consists of a first layer and a second layer.

The first layer, that is, the first magnetic thin film is for exclusive use for writing, and is made of a magnetic thin film with high permeability and high saturation magnetization. The second layer, that is, the second magnetic thin film is for exclusive use for reproducing and is formed of a magnetic thin film having an easy magnetization axis parallel to or in the film surface and a magneto-optical high conversion efficiency and high permeability also. In case when required, in order to raise the writing efficiency of the first layer, a third film constituted of a non-magnetic material is provided between the first and second layers to disconnect the magnetic coupling between the first and second layers.

EXAMPLE 1

Figure 2:
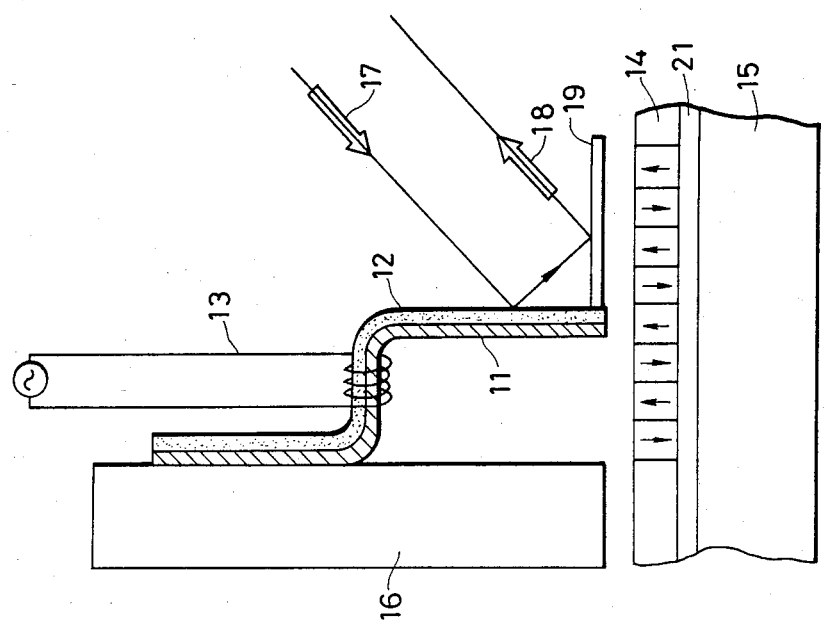

As shown in FIG. 2, in the single pole magnetic head of the present construction, the main pole has a double layer construction with a first layer 11 for writing exclusive use and a second layer 12 for reproducing exclusive use. The first layer is a ferromagnetic thin film made of a material with high permeability of 500-2000, and more preferably with a high saturation megnetization of $4\pi Ms$ as $(4 \times 3.14 \times 150)$ G such as the known FeNi, FeN or like. The second layer is made of a material having high magneto optical conversion efficiency of the Kerr effect and Faraday effect such as the known FeB, CoZr, GdCo, $Y_3Fe_5O_{12}$, etc., and preferably having a rotation angle of the polarization surface by the magneto-optical effect such as the Kerr rotation angle of 0.2° or more. The auxiliary pole 16 consisting of a magnetic material such as Mn-Zn ferrite, Ni-Zn ferrite, Co-Zr alloy or the like is the one which returns the magnetic flux in the head to the side of the recording medium for closing the magnetic circuit. Further, at the lower side of the recording medium 14, there is disposed a planar magnetizable film 21 such as Permalloy on the like to let the magnetic pole be certainly closed. In FIG. 2, although the film 21 is disposed directly at the lower part of the medium, it may be provided in the lower part directly or indirectly.

Also in FIG. 2, the arrow mark in the recording medium 14 designates the direction of magnetization, and the symbol 15 designates the substrate of the recording medium. Also, in the present embodiment, the auxiliary pole 16 is provided on a non magnetic substrate such as, for example, glass, silicon or the like, and although there is provided with a spacer of a non-magnetic material such as, for example, $SiO_2$ between part of the auxiliary pole 16 and the first layer 11 to form a stepped shape, either one of them is omitted in FIG. 2. Also, although a transparent cover layer consisting of a high molecular resin or the like is present on the second layer 12 and a reflecting film 19 is provided on the side surface thereof, these are also not shown in the figure. Also in FIGS. 3 and 4 the illustration of these eliminates are omitted.

In the following, writing and reading out of information by the above-mentioned optically read-out magnetic head will be explained.

At first, in writing, the main magnetic pole having film thickness of 0.1 $\mu m$ and width of 3 $\mu m$ is excited with a coil 13 wound on the main pole such as, for example, for 8 turns. The saturation magnetization in the first layer is $4 \times 3.14 \times 250$ G, and is larger than that of the second layer of $4 \times 3.14 \times 120$ G, and by the strong magnetic flux mainly coming out of the forward end of the first layer, the perpendicular magnetic recording medium 14 such as CoCr, TbFe, CoO, etc. is magnetized to be written in with information. The reproduction is effected as described in the following. The leakage magnetic field from the magnetic domain written in the medium 14 magnetizes the forward end of the main pole. In this case, magnetization reverse is apt to occur in the second layer with a small saturation magnetization. A linearly polarized laser beam 17 (in this embodiment, a semiconductor laser of the wave length of 800 nm was used) is applied on the surface of the second layer as shown in the figure.

The power of the laser beam was 0.1 to 5 mW at the film surface to be irradiated.

In correspondence to the magnetized state of the second layer, Kerr rotation or Faraday rotation occurs and the change of magnetization can be converted into the change of the polarized angle. The reflected beam 18 reaches the detector such as PIN diode or the like on the upper part of the head via the reflection film 19, lens optical system and the analyzer to carry out the reproduction of information as is well known.

Next, the method for manufacturing the optically read-out magnetic head of the above described embodiment will be described.

On a glass substrate with thickness of 1 mm, an auxiliary pole 16 made of MnZn ferrite 10 μm thick was adhered by means of an ordinary organic adhesive or the like. Next, as a spacer, $SiO_2$ of the thickness of 3 μm was laminated and adhered onto said ferrite by a sputtering method. In this case, approximately half of the ferrite surface was sputtered with $SiO_2$ by being provided with an aluminium mask to let $SiO_2$ not adhere on the ferrite at this part. Subsequently, said aluminium mask was dissolved by using nitric acid or the like to remove $SiO_2$ on the aluminium mask to form a structure with a step formed with $SiO_2$ on the surface of the ferrite. Then, a first layer 11 consisting of a known Fe-Ni alloy with high permeability was applied and laminated by the evaporation method or sputtering method to a thickness of 20-300 nm, or typically to a thickness of 100 nm. Further, a second layer 12 consisting of a known GdCo alloy with high magneto-optical conversion efficiency was applied and laminated to a thickness of 20-300 nm, or typically to a thickness of 100 nm. Subsequently, the multi-layered plate with five layer structure including the substrate and produced as shown above was cut by a cutting method such as an ion milling method to the width of 1 to 20 μm or preferably to 1 to 3 μm, and to a length of 10 to 300 μm or typically to 100 μm. Further, a transparent cover layer of a polyimide resin or the like was provided on this multi-layered plate, and at the edge surface of the multi-layered plate, aluminium was evaporated to form a reflection film 19. The exciting coil 13 was formed by the known lithography method in the same manner as in the prior art thin film head or the like.

EXAMPLE 2

In the optically read-out magnetic head of this embodiment, as shown in FIG. 3, the second layer 102 for use in the optical read-out is formed only on the part to be irradiated by the beam, and the other parts are the same as in Example 1 of FIG. 2. In this case, the forward end of the main pole is formed only with the first layer 11, and the forward end film thickness can be reduced to 1 to 10 μm, and typically to 3 μm, so that high density writing and reproduction has become possible. In FIG. 3, the symbols indicating the parts other than the second layer 102 are the same as those in the case of FIG. 2.

The optically read-out magnetic head of this embodiment can be produced by using a known thin film forming method such as the vacuum evaporation method or the sputtering method, and a known thin film patterning method by means of lithography, and the like as in the same manner as in Example 1.

EXAMPLE 3

As shown in FIG. 4, a non-magnetic layer 100 of the thickness of 0.1 to 10 μm made of $SiO_2$, AlN, or a resin was interposed between the first layer 11 and the second layer 202 to disconnect the magnetic coupling. Also, an auxiliary pole 206 was separated into two. The other parts are the same as in Example 1. In this case, the role participation of the writing film and the optically read-out film became more evident, and the formation of suitable thin film materials respectively became possible, while maintaining the function as a composite head. In FIG. 4, symbols 13, 14, 15, 17, 18, 19 and 21 designate the same parts as in the case of FIG. 2.

The optically read-out magnetic head of this embodiment can also be produced by using a known thin film device production method as in the same manner as in Examples 1 and 2.

Figure 1:
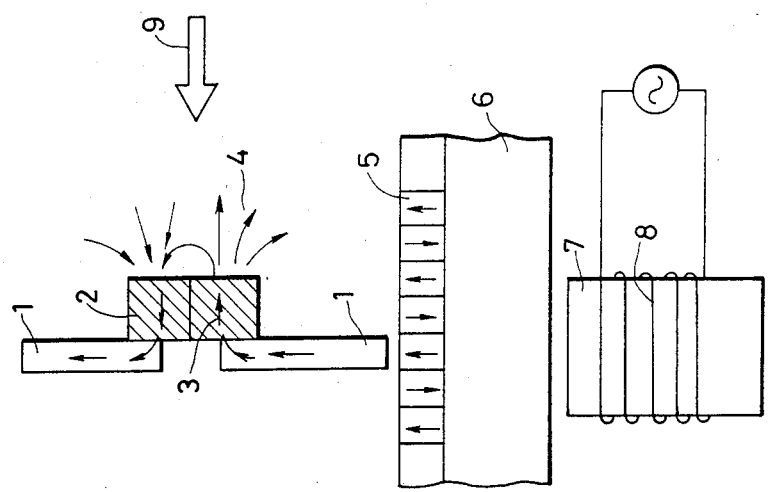
FIG. 1 is a schematic diagram for explaining the optical read-out magnetic head in the prior art.

The optically read-out magnetic head obtained in the above-described respective Examples, was improved in comparison with the prior art optically read-out magnetic head shown in FIG. 1, for approximately one order in the magneto-optical conversion efficiency and the reproducing efficiency.

Next, in Examples 4 to 6, there are shown embodiments of the single pole type magnetic head having such structure that the main pole comprises the above-described first magnetic thin films divided into two and the above-described second magnetic thin film connecting said divided first magnetic thin films. That is, the main pole formed of the first high permeability thin film was divided into two, and in close adherence to these first thin films are arranged a second high permeability film having an easy magnetization axis in the direction parallel to the film surface while having a high longitudinal Kerr effect or Faraday effect. By means of such an arrangement, the magnetic circuits between the divided main magnetic poles are magnetically coupled to be closed by the second magnetic film and a faithful signal reproduction becomes possible to be carried out.

EXAMPLE 4

Figure 5:
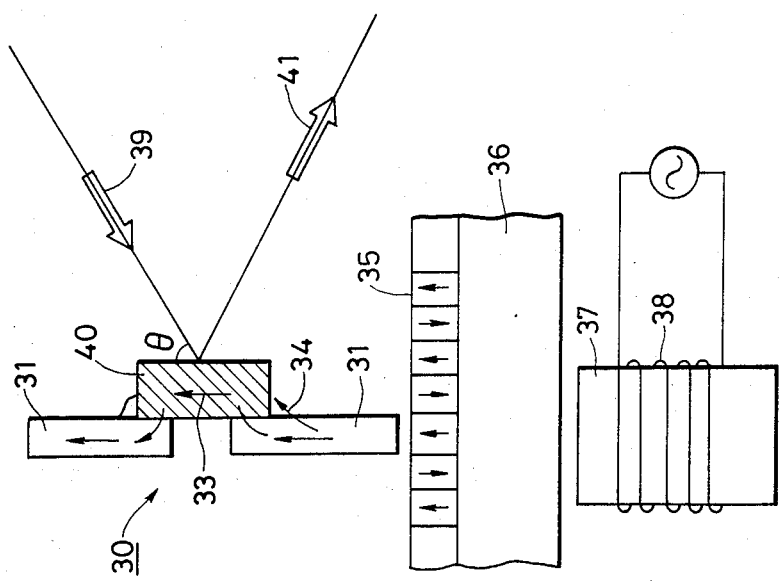

An shown in FIG. 5, the first magnetic thin film 31 consisting of a known high permeability film such as FeNi, CoZr, or the like with film thickness of 0.05 to 0.15 μm and the width of 5 μm is placed at right angles to and in close vicinity to a perpendicular magnetic recording medium 35 such as CoCr, TbFe, CoO or the like. Also, the first magnetic thin film 31 is divided into two as upper and lower parts. The permeability of the first magnetic film is preferably prepared to be 500 or more as in Examples 1 to 3. Further, a magnetic thin film for optical read-out, i.e. the second magnetic thin film 40 is arranged in close adherence to this first magnetic thin film. This thin film 40 has an easy magnetization axis in parallel to the direction in the film surface while it is a magnetic thin film with high magneto-optical conversion efficiency such as the longitudinal Kerr effect, Faraday effect and the like as in Examples 1 to 3. For example, a magnetic garnet to begin with $Y_3Fe_5O_{12}$ (YIG), a rare earth metal-transition metal system amorphous alloy to begin with GdCo, an amorphous metal film such as FeCoBP and the like are used. Further, in opposite side to this main pole consisting of the first and second magnetic thin films, an auxiliary pole 37 consisting of a soft magnetic material such as Mn-Zn ferrite, Ni-Zn ferrite, Co-Zr alloy or the like and a writing coil (exciting coil) 38 are arranged in the reverse side of the medium.

By the way, in FIG. 5, the symbol 33 denotes the direction of magnetization in the second magnetic thin film, the symbol 34 the magnetic flux, the sumbol 36 the substrate of the recording medium, and the arrow in the recording medium 35 the direction of magnetization in the medium. Further, although the first magnetic thin film 31 is provided on a non-magnetic substrate such as glass or the like, it is omitted in FIG. 5.

Next, description will be given on the writing and reading of information by means of an optical read-out magnetic head of the present embodiment.

At first, the writing is effected by exciting the auxiliary pole 37 by the coil 38 to magnetize the main pole 30, thereby to induce the magnetization of the perpendicular magnetic recording medium 35 directly disposed thereunder. The read out is carried out as follows: At first, the leakage magnetic field from the magnetic domain written in the medium 35 induces the magnetization of the first magnetic thin film 31 of the main pole 30 to put it in order in one direction. Furthermore, this magnetization also causes the arrangement of the magnetization of the magneto-optical thin film i.e. the second magnetic thin film 40 closely adhered to the first magnetic thin film 31 into the same direction as that of the first magnetic thin film. When a linearly polarized laser beam 39 is made to be incident at an angle $\theta$ from the upper side obliquely, the beam reflects on the surface of the magneto-optic thin film (in the case of longitudinal Kerr effect) to become a reflected beam 41 and is passed through the lens optical system and a analyzer to be introduced into a photodetector such as a PIN diode or the like. At this instant, the polarized angle of the reflected beam rotates in proportion to $Ms \cos\theta$, when the magnetization of the opto-magnetic thin film is denoted as Ms. In dependence with the direction of the magnetization (upwards and downwards in the figure), this rotation angle changes the sign (anti-clockwise or clockwise rotation). Therefore, by detecting the sign of rotation angle, the direction of magnetization of the magneto-optic thin film, i.e. the second magnetic thin film 40, the direction of magnetization of the first magnetic thin film 31, and, further, the magnetization state of the medium 35 directly under the main pole can be reproduced according to the present embodiment. In the present Example, because the direction of magnetization of the magneto-optic thin film is made parallel to the film surface, the magnetic flux from the first magnetic thin film can be almost completely introduced into the magneto-optic thin film and the magnetic circuit in the beam irradiated part is closed to let the magneto-optic reproducing efficiency to be extremely high while enabling faithful reproduction for following the magnetization state of the medium.

Next, explanation will be given on the method of manufacturing the optically read-out magnetic head of the present embodiment.

An FeNi alloy thin film with the thickness of 50 to 1500 nm, or preferably 100 nm, is formed on a flat substrate such as a glass or silicon plate with thickness of approximately 1 mm as the first magnetic film by means of the evaporation method or the sputtering method. Subsequently, the FeNi alloy thin film was divided and separated in the gap length of 100 to 1000 nm by means of electron beam lithography method or photolithography method to provide a gap part. In this case, the length of the Fe-Ni alloy thin film at the side part of the magnetic recording medium was determined to be 10 to 50 $\mu$m. In such a manner as to be able to connect the separately divided first magnetic thin films 31 on this gap, a thin film (the second magnetic thin film 40) of a material having an easy magnetization axis parallel to or in the film surface with a large magnetic Kerr effect such as a GdCo alloy was formed by the evaporation method or the sputtering method. As concerns the manufacturing method of the auxiliary pole 37 and the coil 38, they are quite the same as those in the prior art.

EXAMPLE 5

Figure 6:
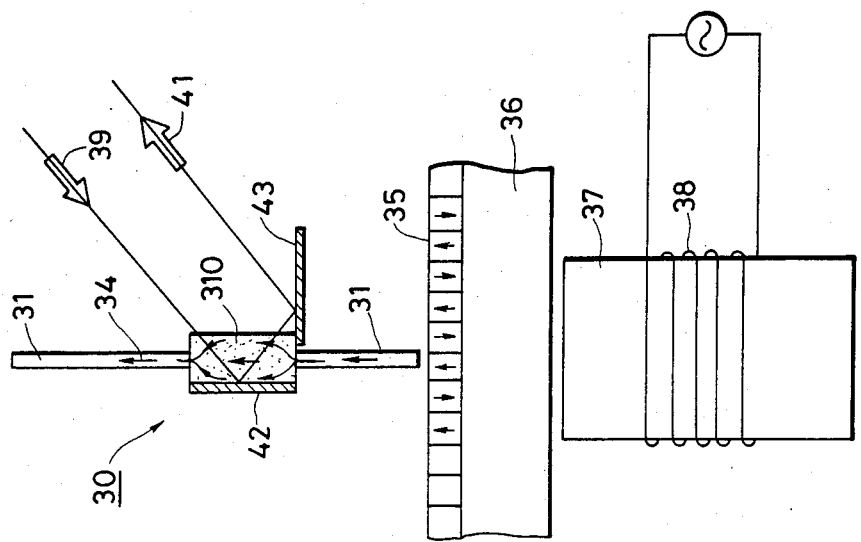

As shown in FIG. 6, a magneto-optic thin film having easy magnetization direction parallel to or in the plane of the film surface, i.e. the second magnetic thin film 310 was arranged in the intermediate position of the first magnetic film 31 divided into two, with the ends contacted thereto to form a main pole 30. In case where a transparent magnetic material such as $Y_3Fe_5O_{12}$ is used, a reflecting film 42 of an aluminium thin film formed by the evaporation method is also provided. Moreover, a secondary reflection film 43 for directing the reflected beam 41 to the upper part of the disc of the recording medium is also arranged. In the case of the Example, the loss of the flux is small and the flux in the first magnetic thin film 31 is caused to be introduced into the magneto-optic thin film, i.e. the second magnetic thin film 310 ore efficiently than in the case of Example 4, and a preferable result can be obtained.

Although not illustrated in FIG. 6, a transparent cover layer for supporting the secondary reflection film 43 is provided, and the secondary reflection film 43 is adhered to the side thereof. Further, symbols in FIG. 6 other than the above are the same as those in FIG. 5.

The optical read-out magnetic head of this Example can be manufactured in the same manner as in Example 4 by using a thin film device manufacturing method utilizing the known thin film formation method such as the evaporation method or the sputtering method, and the known thin film patterning methods by means of lithography.

EXAMPLE 6

Figure 7:
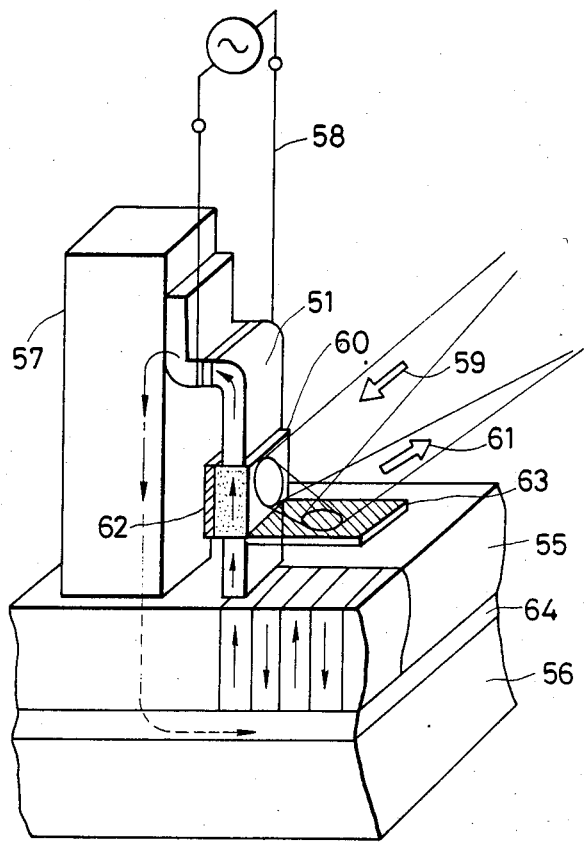

As shown in FIG. 7, an auxiliary pole 57 is provided on the same side as the main pole, and further, at the lower part of the perpendicular magnetic recording medium 55 is arranged a high permeability film 64 (magnetization direction is in the suface). This planar magnetization film 64 (Fe-Ni alloy called permalloy, or the like) functions when it is at the lower part of the medium, even if it is not provided in the direct low part of the medium. The structure in the circumference of the main pole is made as the same as in Example 5. In this case, the magnetic circuit becomes to be perfectly closed through the magneto-optic thin film, i.e. the second magnetic thin film 60 having the magnetization direction parallel to or in the surface, and the reproducing efficiency of the magnetic information from the medium can be made maximum.

In FIG. 7, the symbol 51 denotes the first magnetic thin film, 56 the substrate of the magnetic recording medium, 58 a coil, 59 a linearly polarized lazer beam, 61 the reflected beam, 62 a reflection film, and 63 a secondary reflection film. Further, the arrows in the recording medium indicates the direction of magnetization and the arrows in the other magnetic materials indicate magnetic flux.

The optically read-out magnetic head of this Example can also be manufactured by using a known thin film device manufacturing method in the same manner as in Example 4 and 5.

The optical read-out magnetic heads obtained by respective Examples in the above-described Examples 4 to 6 have been improved for about one order in the magneto-optic conversion efficiency and the reproduction efficiency in comparison to the prior art optical read-out magnetic head shown in FIG. 1.

As evident from the above-described Examples, according to the present invention, by making the magnetization direction of a thin film having the magneto-optic effect be parallel to the film surface, the flux from the high permeability film of the main pole has become induced to be approximately completely into the magneto-optic thin film, and the magneto-optic conversion efficiency and the reproduction efficiency have been improved for about one order in comparison wth the prior art ones shown in FIG. 1. Therefore, according to the present invention, the line direction period of a magnetic disc can be made so small as down to the order of the film thickness of 0.1 µm of the main pole, and together with that, the track direction period can be made so small as to be equal to the laser beam diameter (1 to 5 µm). As a result, the recording density could be improved to a large extent up to the region of 10 bit/µm$^2$ which was impossible in the prior art.

What is claimed is:

1. An optical read-out magnetic head of a single pole type, comprising a main pole, an auxiliary pole and a writing coil, said main pole including a first magnetic thin film having high permeability and a second magnetic thin film having magneto-optical effects, and second magnetic thin film being arranged for being magnetized by a leakage magnetic field from a magnetic recording medium which is disposed proximate to said main pole and extends in a direction perpendicular to said main pole, and said second magnetic thin film having an easy magnetization axis extending parallel to or in the plane of the film surface of said first magnetic thin film, and, further, said magnetic head enabling magnetic writing.

2. An optical read-out magnetic head according to claim 1, wherein said first magnetic thin film and said second magnetic thin film are magnetically coupled.

3. An optical read-out magnetic head according to claim 2, wherein said main pole is a double layer film including said first magnetic thin film and second thin film.

4. An optical read-out magnetic head according to claim 2, wherein said main pole is constituted by said first magnetic thin film divided into two parts, and said second magnetic thin film being disposed for connecting said two parts.

5. An optical read-out magnetic head according to claim 1, wherein said main pole is constituted by said first magnetic thin film and said second magnetic thin film laminated therewith via a non-magnetic material film.

6. An optical read-out magnetic head according to claim 1, wherein the permeability of said first magnetic thin film is 500.

7. An optical read-out magnetic head according to claim 6, wherein said second magnetic film provides a rotation angle of a polarization surface thereof due to the magneto-optic effect of at least 0.2°.

* * * * *